United States Patent [19]

Scherr et al.

[11] Patent Number: 5,536,370
[45] Date of Patent: Jul. 16, 1996

[54] CONDENSATES OF POLYALKYLENEPOLYAMINES, THEIR PREPARATION AND THEIR USE IN PAPERMAKING

[75] Inventors: Guenter Scherr, Ludwigshafen; Wolfgang Reuther; Primoz Lorencak, both of Heidelberg; Dietmar Moench; Friedrich Linhart, both of Weinheim; Juergen Weiser, Schriesheim, all of Germany

[73] Assignee: BASF Aktiengesellschaft, Ludwigshafen, Germany

[21] Appl. No.: 424,520

[22] PCT Filed: Nov. 16, 1993

[86] PCT No.: PCT/EP93/03205

§ 371 Date: May 26, 1995

§ 102(e) Date: May 26, 1995

[87] PCT Pub. No.: WO94/12560

PCT Pub. Date: Jun. 9, 1994

[30] Foreign Application Priority Data

Nov. 28, 1992 [DE] Germany .......................... 42 40 110.0

[51] Int. Cl.⁶ .................................................. D21H 17/54
[52] U.S. Cl. .................. 162/164.3; 528/271; 528/295.5; 528/332; 528/392; 528/403; 525/418; 525/540; 162/164.6; 162/167
[58] Field of Search .................................. 528/271, 295.5, 528/332, 392, 403; 525/418, 540; 162/164.3, 164.6, 167

[56] References Cited

U.S. PATENT DOCUMENTS

| | | | |
|---|---|---|---|
| 4,144,123 | 3/1979 | Scharf et al. ........................ | 162/164 R |
| 4,450,045 | 5/1984 | Hertel et al. .......................... | 162/164.3 |
| 4,708,772 | 11/1987 | Maslanka ............................. | 162/164.3 |
| 4,714,736 | 12/1987 | Juhl et al. ................................ | 524/608 |
| 4,975,499 | 12/1990 | Bachem et al. .......................... | 525/430 |
| 5,017,642 | 5/1991 | Hasegawa et al. ...................... | 524/608 |
| 5,019,606 | 5/1991 | Marten et al. ........................... | 523/414 |
| 5,145,559 | 9/1992 | Auhorn et al. .......................... | 162/168.2 |
| 5,171,795 | 12/1992 | Miller et al. ............................. | 525/430 |
| 5,189,142 | 2/1993 | Devore et al. ......................... | 528/339.3 |
| 5,239,047 | 8/1993 | Devore et al. ......................... | 528/339.3 |
| 5,256,727 | 10/1993 | Dulaney et al. ......................... | 524/608 |
| 5,278,255 | 1/1994 | Weaver, Jr. et al. ..................... | 525/421 |
| 5,316,623 | 5/1994 | Espy ..................................... | 162/164.3 |
| 5,362,614 | 11/1994 | Serizawa et al. ........................ | 430/538 |
| 5,367,005 | 11/1994 | Nachfolger ............................. | 523/403 |
| 5,427,652 | 5/1995 | Darlington et al. ................... | 162/164.3 |

FOREIGN PATENT DOCUMENTS

| | | |
|---|---|---|
| 2046304 | 9/1970 | Germany . |
| 2916356 | 4/1979 | Germany . |
| 2436386 | 7/1974 | United Kingdom . |

Primary Examiner—Samuel A. Acquah
Attorney, Agent, or Firm—Oblon, Spivak, McClelland, Maier & Neustadt

[57] ABSTRACT

Condensates of polyalkylenepolyamines which are obtainable by (a) partial amidation of polyalkylenepolyamines and
(b) condensation of the partially amidated polyalkylenepolyamines with bifunctional or polyfunctional crosslinking agents to give crosslinked polyalkylenepolyamines which, in 20% strength aqueous solution at 20° C., have a viscosity of at least 100 mPa.s, processes for the preparation of the condensates of polyalkylenepolyamines by partial amidation of polyalkylenepolyamines with carboxylic acids, carboxylic esters, carboxylic anhydrides or carbonyl halides and crosslinking of the partially amidated polyalkylenepolyamines with bifunctional or polyfunctional crosslinking agents, from 0.001 to 10 parts by weight of a crosslinking agent being used per part by weight of the partially amidated polyalkylenepolyamines, and the use of the resulting condensates as drainage aids, flocculants, retention aids and fixing agents in papermaking.

8 Claims, No Drawings

CONDENSATES OF POLYALKYLENEPOLYAMINES, THEIR PREPARATION AND THEIR USE IN PAPERMAKING

This application is a 371 of EP93/03205 filed Nov. 16, 1993.

The present invention relates to condensates of polyalkylenepolyamines, which are obtainable by partial amidation of polyalkylenepolyamines and subsequent condensation of the partially amidated polyalkylenepolyamines with bifunctional or polyfunctional crosslinking agents, processes for the preparation of the condensates by partial amidation of polyalkylenepolyamines and condensation of the partially amidated polyalkylenepolyamines with bifunctional or polyfunctional crosslinking agents, and the use of the condensates as drainage aids, flocculants, retention aids and fixing agents in papermaking.

DE-A-2 046 304 discloses detergents which contain partially amidated polyethyleneimines as softeners. These products are prepared by reacting a polyethyleneimine with a fatty acid or with a fatty ester at elevated temperatures, for example at 150° C.

DE-C-2 434 816 discloses a process for the preparation of nitrogen-containing condensates, in which polyamidoamines are grafted with ethyleneimine and the reaction products thus obtainable are reacted with α,ω-bis(chlorohydrin) ethers of polyalkylene oxides at from 20° to 100° C., and the reaction is continued until the formation of high molecular weight resins which are still just water-soluble and have a viscosity of more than 300 mPa.s, measured at 20° C. in 20% strength by weight aqueous solution. The condensates thus obtainable are used as retention aids, flocculants and drainage aids in papermaking.

DE-C-2 436 386 discloses the use of nitrogen-containing condensates based on polyalkylenepolyamines as drainage accelerators and retention aids in the paper industry. The nitrogen-containing condensates are prepared by reacting polyalkylenepolyamines which contain from 15 to 500 alkyleneimine units with α,ω-chlorohydrin ethers of polyethylene oxides which contain from 18 to 90 ethylene oxide units, at from 20° to 100° C., with formation of high molecular weight resins which are still water-soluble.

DE-C-2 916 356 discloses a process for the preparation of water-soluble polyetheramines, in which di- or polyamines having from 2 to 10 nitrogen atoms are subjected to a condensation reaction with chlorohydrin ethers obtained from 1 mol of a dihydric alcohol of 2 to 5 carbon atoms, its ethoxylation products which contain up to 18 ethylene oxide units, glycerol or polyglycerol which contains up to 15 glycerol units, and at least from 2 to 8 mol of epichlorohydrin, initially in polar, water-miscible solvents in the absence of water or in the substantial absence of water, at from 110° to 200° C., and an alkali metal base or alkaline earth metal base is then added in an amount sufficient to neutralize at least 20% of the hydrogen chloride formed in the condensation. Thereafter, a postcondensation is also carried out. The condensation products are used as flocculants, retention aids and drainage aids in papermaking.

Of the condensates described above, the substances disclosed in DE-C-2 434 816 have proven particularly useful in practice as retention aids and drainage aids in papermaking. However, all of the abovementioned condensates have virtually no fixing action for sizes or interfering substances in papermaking. Moreover, they are more or less susceptible to interfering substances which accumulate in the paper stock owing to the increasing use of closed water circulations in paper machines.

It is an object of the present invention to provide novel substances. It is a further object to provide, for papermaking, an assistant which acts simultaneously as a fixing agent and as a drainage aid, flocculant and retention aid.

We have found that these objects are achieved, according to the invention, by condensates of polyalkylenepolyamines, which are obtainable by (a) partial amidation of polyalkylenepolyamines and (b) condensation of the partially amidated polyalkylenepolyamines with bifunctional or polyfunctional crosslinking agents which have, as a functional group, a halohydrin, ethoxy, aziridine or isocyanate unit or a halogen atom, to give crosslinked polyalkylenepolyamines which have a viscosity of at least 100 mPa.s in 20% strength by weight aqueous solution at 20° C.

The present invention furthermore relates to a process for the preparation of the stated condensates, in which (a) polyalkylenepolyamines are partially amidated by reaction with carboxylic acids, carboxylic esters, carboxylic anhydrides or carbonyl halides and (b) the partially amidated polyalkylenepolyamines are reacted with bifunctional or polyfunctional crosslinking agents which have, as functional group, a halohydrin, glycidyl, aziridine or isocyanate unit or a halogen atom, in a weight ratio of (a) to (b) of from 1:0.001 to 1:10, to give crosslinked polyalkylenepolyamines which have a viscosity of at least 100 mPa.s in 20% strength by weight aqueous solution at 20° C.

The object described last is achieved by using the condensates as drainage aids, flocculants, retention aids and fixing agents in papermaking.

The novel condensates are prepared by crosslinking partially amidated polyalkylenepolyamines. All polyalkylenepolyamines may be used for this purpose, for example diethylenetriamine, triethylenetetramine, tetraethylenepentamine, pentaethylene-hexamine, diaminopropylethylenediamine, trisaminopropylamine and polyethyleneimines. The polyethyleneimines preferably have an average molecular weight ($M_w$) of from at least 300 to 1,000,000. Preferred polyethyleneimines are those which have molecular weights of from 1200 to 25,000.

In the first process step (a) of the preparation of the novel condensates, the polyalkylenepolyamines are partially amidated so that, for example, from 0.1 to 90% of the nitrogen atoms capable of undergoing amidation are present as amido groups in the polyalkylenepolyamines. The primary and secondary nitrogen atoms in the polyalkylenepolyamines are capable of undergoing amidation, primary and secondary amino groups each reacting only with one carboxylic acid. The polyalkylenepolyamines preferably undergo from 1 to 30, in general only up to 20, % amidation. The amidated polyalkylenepolyamines must in fact still have NH groups so that they can be reacted with a crosslinking agent.

The polyalkylenepolyamines are amidated in a known manner, for example by reaction with carboxylic acids. The carboxylic acids may be of, for example, 1 to 28, preferably 1 to 18, carbon atoms. They may be saturated or may contain one or more ethylenically unsaturated nonconjugated double bonds. Examples of suitable carboxylic acids are formic acid, acetic acid, propionic acid, butyric acid, capric acid, 2-ethylhexanoic acid, benzoic acid, lauric acid, myristic acid, palmitic acid, stearic acid, oleic acid, linoleic acid, arachidic acid, erucic acid, behenic acid and fatty acid mixtures which are obtained, for example, from naturally occurring fatty esters, for example from coconut fat, tallow, soybean oil, linseed oil, rapeseed soil and fish oil. Half-esters of dicarboxylic acids, such as monomethyl succinate, monoethyl succinate, monomethyl maleate, monomethyl fumarate and mono-tert-butyl maleate, and monoethylenically unsaturated carboxylic acids, such as acrylic acid, and methacrylic, are also suitable. $C_1$–$C_{18}$-carboxylic acids or esters thereof with monohydric $C_1$–$C_4$-alcohols are preferably used. Among the carboxylic acids having a small number of carbon atoms, for example up to $C_8$-carboxylic acids, saturated carboxylic acids are preferably used, whereas in the case of the carboxylic acids having a larger number of carbon atoms in the molecule it is also possible advantageously to employ unsaturated carboxylic acids, for example oleic acid or linolenic acid.

In addition to the stated carboxylic acids and carboxylic esters in which the alcohol radical is of 1 to 4 carbon atoms, carboxylic anhydrides, carbonyl halides or alkyldiketenes may be used for the preparation of the partially amidated polyalkylenepolyamines. Reaction products of stearyl-, palmityl-, lauryl-, oleyl- and behenyldiketene or of mixtures of the stated diketenes with polyalkylenepolyamines and in particular polyethyleneimines are of particular interest. Of course, the reaction products of polyalkylenepolyamines with short-chain alkyldiketenes, such as diketene, are also of interest in practice. The reaction temperatures in the amidation are, as a rule, from 20° to 250° C., preferably from 130° to 180° C.

In process step (b), the partially amidated polyalkylenepolyamines are reacted with bifunctional or polyfunctional crosslinking agents which have, as functional group, a halohydrin, glycidyl, aziridine or isocyanate unit or a halogen atom. Some of the crosslinking agents of this type are stated in the prior art publications. By reacting the partially amidated polyalkylenepolyamines with the crosslinking agents, the molecular weight of the amidated polyamidoamines is increased. Suitable crosslinking agents are, for example, epihalohydrins, in particular epichlorohydrin, and α,ω-bis(chlorohydrin)polyalkylene glycol ethers and the α,ω-bisepoxides of polyalkylene glycol ethers, which bisepoxides are obtainable therefrom by treatment with bases. The chlorohydrin ethers are prepared, for example, by reacting polyalkylene glycols with epichlorohydrin in a molar ratio of from at least 1:2 to 1:5. Suitable polyalkylene glycols are, for example, polyethylene glycol, polypropylene glycol and polybutylene glycols and block copolymers of $C_2$–$C_4$-alkylene oxides. The average molecular weights ($M_w$) of the polyalkylene glycols are, for example, from 200 to 6000, preferably from 300 to 2000, g/mol. α,ω-Bis(chlorohydrin)polyalkylene glycol ethers of this type are described, for example, in DE-C-2 434 816, which is stated as prior art. As likewise stated therein, the corresponding bisglycidyl ethers are formed from the dichlorohydrin ethers by treatment with bases. Other suitable crosslinking agents are α,ω-dichloropolyalkylene glycols, which are disclosed, for example, as crosslinking agents in EP-B-0 025 515. Other useful crosslinking agents are α,ω- or vicinal dichloroalkanes, for example 1,2-dichloroethane, 1,2-dichloropropane, 1,3-dichloropropane, 1,4-dichlorobutane and 1,6-dichlorohexane. Examples of further crosslinking agents are the reaction products of at least trihydric alcohols with epichlorohydrin, which reaction products have at least two chlorohydrin units; the polyhydric alcohols used are, for example, glycerol, ethoxylated or propoxylated glycerols, polyglycerols having from 2 to 15 glycerol units in the molecule and polyglycerols which may be ethoxylated and/or propoxylated. Crosslinking agents of this type are disclosed, for example, in the abovementioned DE-C-2 916 356. Crosslinking agents which contain blocked isocyanate groups, for example trimethylhexamethylene diisocyanate blocked with 2,2,3,6-tetra-methylpiperidin-4-one, are also suitable. Such crosslinking agents are disclosed, for example, in DE-A-4 028 285 and are crosslinking agents containing aziridine units and based on polyethers or substituted hydrocarbons, e.g. 1,6-bis-N-aziridinohexane (cf. U.S. Pat. No. 3 977 923). It is of course also possible to use mixtures of two or more crosslinking agents for increasing the molecular weight of the amidated polyalkylenepolyamines.

For the preparation of the novel condensates, (a) the amidated polyalkylenepolyamines are reacted with (b) bifunctional or polyfunctional crosslinking agents in a weight ratio (a):(b) of from 1:0.001 to 1:10, preferably from 1:0.01 to 1:3.

The crosslinking of the amidated polyalkylenepolyamines described under (a) with the crosslinking agents stated under (b) is carried out at from 0° to 200° C., preferably from 50° to 80° C. The reaction can be carried out in the absence of a solvent or, preferably, in a solvent. The preferred solvent is water. Alcohols, for example $C_1$–$C_{12}$-alcohols, such as methanol, ethanol, n-propanol, isopropanol and butanols, and ethers, e.g. polyethylene glycol dimethyl ether and tetrahydrofuran, and mixtures of these solvents with one another and/or water are also suitable. The reaction of the components (a) and (b) is preferably carried out in an aqueous medium. The pH in the reaction is usually from 10 to 14, preferably from 10 to 12. For this purpose, it may be necessary to add a base or a mixture of bases during the condensation reaction. Examples of suitable bases are sodium hydroxide solution, potassium hydroxide solution, calcium hydroxide, barium hydroxide and tertiary amines, e.g. triethylamine, triethanolamine or tri-n-propylamine. The preferably used base is sodium hydroxide. The condensation can be carried out continuously or batchwise. In order to prepare particularly high molecular weight condensates, for example relatively high molecular weight polyethyleneimines, for example those having average molecular weights ($M_w$) of from 1000 to 10,000, are reacted with bischlorohydrin ethers of polyalkylene glycols, having a molecular weight of from 300 to 6000, preferably from 800 to 1500. Very high molecular weight condensates are also formed, for example, in the condensation of partially amidated polyethyleneimines, having a molecular weight of at least 500,000, with epichlorohydrin.

The condensates described above are used as drainage aids, flocculants, retention aids and fixing agents in papermaking. For this purpose, they are added to the paper stock in an amount of from 0.01 to 2, preferably from 0.02 to 1, % by weight, based in each case on the solids. The novel condensates thus have the properties of typical fixing agents, for example polyethyleneimines, polydimethyldiallylammonium chlorides or condensates of urea/formaldehyde/dicyandiamide/ammoniumchloride, and are simultaneously drainage aids, flocculants and retention aids. The abovementioned typical fixing agents have been required to date for fixing additives and interfering substances in papermaking, and it was also necessary to use a drainage aid and retention aid in papermaking. Compared with the known nitrogen-containing condensates having a similar composition, the novel products have the advantage that they result in substantially better reduction in the COD value and the cationic demand in papermaking.

The novel condensates can be used for the production of all paper, board and cardboard qualities, for example newsprint (the letterpress/offset printing), medium writing and printing papers, natural gravure printing papers and also light-weight base papers. The principal raw material components used for the production of such papers are groundwood, thermal mechanical pulp (TMP), chemothermomechanical pulp (CTMP), pressure groundwood (PGW), and a sulfite and sulfate pulp, each of which may be short-fiber or long-fiber. Suitable raw materials for the production of the pulps are also chemical pulp and mechanical pulp, which are further processed in integrated mills directly in more or less moist form, without prior thickening or drying, to give the paper and, because the impurities have not been completely removed, still contain, from the digestion, substances which greatly impair the conventional papermaking process. In the novel process, both filler-free and filler-containing papers can be produced. The filler content of the paper may be up to 30% by weight and is preferably from 5 to 25% by weight. Examples of suitable fillers are clay, kaolin, chalk, talc, titanium dioxide, calcium sulfate, barium sulfate, alumina, satin white or mixtures of the stated fillers. If filler-containing papers are produced, an aqueous suspension of fiber and filler is first prepared.

The novel condensates are particularly advantageously used in the production of paper from waste paper and from material systems which contain interfering substances which accumulate in partially or completely closed water circulations of paper machines.

In the examples which follow, percentages are by weight. The viscosities were measured in a Brookfield viscometer at a concentration of 20% by weight and at 20° C., unless stated otherwise.

EXAMPLE 1

799 g of polyethyleneimine having an average molecular weight ($M_w$) of about 25,000 are initially taken in a 2 liter flask equipped with a stirrer, thermometer and a means for working under nitrogen, and are heated to 140° C. under a nitrogen stream, and 69 g of propionic acid are added in the course of 30 minutes. The reaction temperature is increased to 180° C. The water formed in the reaction is separated off continuously. The reaction is complete after 5 hours. The polyethyleneimine has a degree of amidation of 5%.

200 g of the amidated polyethyleneimine described above are dissolved in 700 ml of water and heated to 70° C., and 36.5 ml of a 21% strength aqueous solution of a bis(chlorohydrin)polyethylene glycol having a molecular weight of 400 are added a little at a time at this temperature in about 3 hours. The reaction mixture is kept at 70° C. for 1 hour. After the end of the condensation reaction, 85 g of an 85% strength formic acid are added to the reaction mixture, which then has a pH of 8. 1018 g of a 20.7% strength aqueous solution of a crosslinked, partially amidated polyethyleneimine (condensate 1) which has a viscosity of 884 mPa.s are obtained.

EXAMPLE 2

732 g of polyethyleneimine having a number average molecular weight ($M_w$) of about 25,000 are initially taken in the apparatus described in Example 1 and are heated to 140° C. under a nitrogen stream. As soon as this temperature is reached, 106.7 g of benzoic acid are added in the course of 30 minutes and the reaction mixture is heated to 180° C. The water formed in the partial amidation is distilled off continuously. A polyethyleneimine 5% amidated with benzoic acid is obtained.

200 g of the partially amidated polyethyleneimine described above are dissolved in 650 ml of water. The aqueous solution is heated to 70° C. and is crosslinked in the course of 240 minutes with 36.3 ml of a 21% strength aqueous solution of the α,ω-bis(chlorohydrin) ether of a polyethylene glycol having a molecular weight of 400. The pH of the reaction mixture is 11. The condensation reaction is complete after a further hour. 90 ml of formic acid are then added. The pH of the reaction mixture is then about 8. 976 g of a 22.7% strength aqueous solution of a crosslinked polyethyleneimine partially amidated with benzoic acid are obtained (condensate 2). A 20% strength aqueous solution of this product has a viscosity of 1012 mPa.s.

EXAMPLE 3

430 g of an anhydrous polyethyleneimine having an average molecular weight ($M_w$) of 25,000 are initially taken in the apparatus stated in Example 1. 90 g of acetic acid are gradually added under a nitrogen atmosphere. Owing to the exothermic reaction, the temperature increases to such an extent that the water formed in the reaction distils off. The reaction mixture is heated to 180° C. and kept at this temperature for 4 hours. After the water formed in the reaction has distilled off, the reaction mixture is stirred for about a further 30 minutes at 180° C. and then cooled. 511 g of a polyethyleneimine 15% amidated with acetic acid are obtained.

137.5 g of the amidated polyethyleneimine described above are dissolved in 412.5 g of water. The solution is heated to 70° C., and 67 ml of a 21% strength aqueous solution of the bischlorohydrin ether of a polyalkylene glycol having a molecular weight of 1500 are added in the course of 180 minutes. The condensation is carried out in the presence of 5 g of sodium hydroxide in the course of 4 hours. After the end of the condensation reaction, 48.4 g of 85% strength formic acid are added, so that 664 g of a 23% strength aqueous solution of a crosslinked, amidated polyethyleneimine (condensate 3) are obtained. A 20% strength aqueous solution has a viscosity of 1000 mPa.s.

Use Examples

The chemical oxygen demand, COD, was determined according to DIN 38 409.

The cationic demand is the amount of condensate 4 (cf. below) which is required to bring one liter of white water to the isoelectric point. The end point determination was carried out potentiometrically by means of particle charge detector PCD 02 from Mütek GmbH, D-8036 Herrsching.

The following polymers were used as comparative products:

Condensate 4: polyamidoamine obtained from adipic acid and diethylenetriamine, which was grafted with ethyleneimine and crosslinked with polyethylene glycol dichlorohydrin ether (cf. Example 3 of DE-C-2 434 816).

Polymer 1: commercially available aqueous solution of polydiallyldimethylammonium chloride having a molecular weight of 100,000 g/mol, as fixing agent.

EXAMPLES 4 AND 5

Several samples of paper stocks containing interfering substances were prepared by adding in each case 3% (based on dry paper stock) of a commercial sodium lignin sulfonate to one liter of a paper stock consisting of TMP and semibleached sulfate pulp and having a consistency of 40 g/l, a pH of 7 and a freeness of 68° SR (Schopper-Riegler). The amounts of condensates or polymer stated in Table 1 were then metered in. After 5 minutes, the fibers were filtered off and the COD and cationic demand of the filtrate were determined. The results thus obtained are shown in Table 1.

TABLE 1

| Example | Comparative Example | Polymer addition | COD (Mg O$_2$/l) | | Cat. demand (mg/l) | |
|---|---|---|---|---|---|---|
| | | [%] | 0.3 | 0.6 | 0.3 | 0.6 |
| 4 | — | Condensate 1 | 598 | 256 | 280 | 22 |
| 5 | — | Condensate 2 | 565 | 259 | 260 | 21 |
| — | 1 | Condensate 4 | 635 | 547 | 346 | 219 |
| — | 2 | Polymer 1 | 610 | 486 | 410 | 110 |
| — | 3 | — | 644 | | 658 | |

EXAMPLE 6

Several samples of paper stocks containing interfering substances were prepared similarly to Examples 4 and 5 by metering 40 ml of a wood extract, instead of sodium lignin sulfonate, in each case into one liter of paper stock. The wood extract was prepared by heating 250 g of wood chips in 2.5 l of water at 120° C. for 4 hours in an autoclave. The results are shown in Table 2.

TABLE 2

| Example | Comparative Example | Polymer addition | COD (mg O$_2$/l) | | Cat. demand (mg/l) | |
|---|---|---|---|---|---|---|
| | | [%] | 0.3 | 0.6 | 0.3 | 0.6 |
| 6 | — | Condensate 3 | 1204 | 1078 | 330 | 180 |
| — | 4 | Condensate 4 | 1318 | 1220 | 540 | 460 |
| — | 5 | Polymer 1 | 1242 | 1178 | 455 | 230 |
| — | 6 | Without addition of polymer | 1302 | | 665 | |

EXAMPLE 7 TO 9

The condensates shown in each case in Table 3 were added in an amount of 0.04% by weight, based on dry paper stock, to a paper stock consisting of 100% of unprinted newsprint and 10% of clay and having a consistency of 2 g/l and a pH of 7.0, and the resulting paper stock was then drained in a Schopper-Riegler apparatus, in each case after an action time of 30 seconds. The drainage time thus determined and the optical transparency of the white water are shown in Table 3 for the condensates 1 to 4 used in each case.

TABLE 3

| Example | Comparative Example | 0.04% by weight of polymer added | Drainage time [sec/700 ml] | Optical transparency [%] |
|---|---|---|---|---|
| 7 | — | Condensate 1 | 41 | 54 |
| 8 | — | Condensate 2 | 42 | 54 |
| 9 | — | Condensate 3 | 42 | 53 |
| — | 7 | Condensate 4 | 42 | 53 |
| — | 8 | Without addition of polymer | 86 | 17 |

EXAMPLES 10 TO 12

A paper stock consisting of 100% of wastepaper (⅓ half tone paper, ⅓ corrugated board, ⅓ unprinted newsprint) and having a consistency of 2 g/l and a pH of 7.0 was first prepared. The paper stock was divided into 5 parts. One part of the paper stock was drained in a Schopper-Riegler apparatus without any further addition, while the condensates stated in Table 4 were each added to one of the other 4 samples, in an amount of from 0.08% by weight, based on the dry paper stock, and drainage was carried out in a Schopper-Riegler apparatus after an action time of 30 seconds. The results thus obtained are shown in Table 4.

TABLE 4

| Example | Comparative Example | Polymer addition | Drainage time [sec/700 ml] | Optical transparency [%] |
|---|---|---|---|---|
| 10 | — | Condensate 1 | 37 | 62 |
| 11 | — | Condensate 2 | 41 | 57 |
| 12 | — | Condensate 3 | 40 | 60 |
| — | 9 | Condensate 4 | 44 | 56 |
| — | 10 | — | 93 | 12 |

EXAMPLES 13 TO 15

Examples 10 to 12 were repeated with the single exception that 1%, based on dry fiber, of water glass was added to the paper stock. The results thus obtained are shown in Table 5.

TABLE 5

| Example | Comparative Example | Polymer addition | Drainage time [sec/700 ml] | Optical transparency [%] |
|---|---|---|---|---|
| 13 | — | Condensate 1 | 55 | 43 |
| 14 | — | Condensate 2 | 58 | 44 |
| 15 | — | Condensate 3 | 59 | 44 |
| — | 11 | Condensate 4 | 68 | 33 |
| — | 12 | — | 97 | 11 |

We claim:

1. A condensate of a polyalkylenepolyamine, which is obtainable by
   (a) partial amidation of the polyalkylenepolyamine and
   (b) condensation of the partially amidated polyalkylenepolyamine with a bifunctional or polyfunctional crosslinking agent which has, as a functional group, a halohydrin, glycidyl, aziridine or isocyanate unit or a halogen atom, to give a crosslinked polyalkylenepolyamine which, in 20% strength by weight aqueous solution at 20° C., has a viscosity of at least 100 mPa.s.

2. A condensate as claimed in claim 1, which is obtained by
   (a) from 0.1 to 90% amidation of a polyethyleneimine and
   (b) condensation of the partially amidated polyethyleneimine with epichlorohydrin, an α,ω-bis(chlorohydrin)polyalkylene glycol ether, an α,ω-bis(epoxide) of a polyalkylene glycol ether, an α,ω-dichloropolyalkylene glycol or an α,ω- or vicinal dichloroalkane or a mixture thereof.

3. A process for the preparation of a condensate as claimed in claim 1, wherein
   (a) a polyalkylenepolyamine is partially amidated by reaction with a carboxylic acid, carboxylic ester, carboxylic anhydride or carbonyl halide and
   (b) the partially amidated polyalkylenepolyamine is reacted with a bifunctional or polyfunctional crosslinking agent which has, as a functional group, a halohydrin, epoxy, aziridine or isocyanate unit or a halogen atom, in a weight ratio (a):(b) of from 1:0.001 to 1:10 to give a crosslinked polyalkylenepolyamine which, in 20% strength by weight aqueous solution at 20° C., has a viscosity of at least 100 mPa.s.

4. A process as claimed in claim 3, wherein
(a) a polyethyleneimine having a molecular weight of at least 300 is 0.1 to 90% amidarid by reaction with a $C_1$–$C_{18}$-carboxylic acid or with an ester of this carboxylic acid with a monohydric $C_1$–$C_4$-alcohol and
(b) the partially amidated polyethyleneimine is subjected to a condensation reaction with epichlorohydrin, an α,ω-bis(chlorohydrin)polyalkylene glycol ether, an α,ω-bis(glycidyl) ether of a polyalkylene glycol, an α,ω-dichloropolyalkylene glycol, or an α,ω- or vicinal dichloroalkane or a mixture thereof in a weight ratio (a):(b) of from 1:0.01 to 1:3.

5. A condensate as claimed in claim 1, wherein a polyalkylenepolyamine partially amidated with an alkyldiketene is used as component (a).

6. A condensate as claimed in claim 1, wherein from 1 to 30% amidated polyalkylenepolyamine is used as component (a).

7. A process for the production of paper, board or cardboard by draining a paper stock to form sheets, wherein the condensate as claimed in claim 1 is used as a drainage aid, flocculent, retention aid or fixing agent.

8. A process as claimed in claim 7, wherein the condensate is added to a paper stock in an amount of from 0.01 to 2% by weight, based in each case on the solids.

* * * * *